United States Patent
Belmonte Rodrigues De Castro et al.

(10) Patent No.: US 9,902,785 B2
(45) Date of Patent: Feb. 27, 2018

(54) POLYMER DISPERSIONS, THEIR PREPARATION AND USE

(71) Applicant: CELANESE EMULSIONS GMBH, Sulzbach (DE)

(72) Inventors: Lizandra Belmonte Rodrigues De Castro, Sao Paulo (BR); Thomas Fichtner, Dalheim (DE); Kerstin Gohr, Hochheim (DE); Stephan Krieger, Hofheim (DE)

(73) Assignee: CELANESE SALES GERMANY GMBH, Sulzbach (DE)

( * ) Notice: Subject to any disclaimer, the term of this patent is extended or adjusted under 35 U.S.C. 154(b) by 0 days.

(21) Appl. No.: 14/366,216

(22) PCT Filed: Dec. 19, 2012

(86) PCT No.: PCT/IB2012/003018
§ 371 (c)(1),
(2) Date: Jun. 17, 2014

(87) PCT Pub. No.: WO2013/093632
PCT Pub. Date: Jun. 27, 2013

(65) Prior Publication Data
US 2014/0350172 A1    Nov. 27, 2014

Related U.S. Application Data

(60) Provisional application No. 61/578,941, filed on Dec. 22, 2011.

(51) Int. Cl.
| | | |
|---|---|---|
| C08F 2/22 | (2006.01) | |
| C08F 2/00 | (2006.01) | |
| C08F 220/18 | (2006.01) | |
| C08F 263/04 | (2006.01) | |
| C08F 210/02 | (2006.01) | |
| C08F 2/24 | (2006.01) | |
| C09D 151/00 | (2006.01) | |
| C08F 2/26 | (2006.01) | |
| C08F 2/30 | (2006.01) | |
| C09D 133/08 | (2006.01) | |
| C09D 133/12 | (2006.01) | |

(52) U.S. Cl.
CPC .............. *C08F 2/22* (2013.01); *C08F 2/001* (2013.01); *C08F 2/24* (2013.01); *C08F 2/26* (2013.01); *C08F 2/30* (2013.01); *C08F 210/02* (2013.01); *C08F 220/18* (2013.01); *C08F 263/04* (2013.01); *C09D 133/08* (2013.01); *C09D 133/12* (2013.01); *C09D 151/003* (2013.01)

(58) Field of Classification Search
CPC .... C08F 2/22; C08F 2/001; C08F 2/24; C08F 2/26; C08F 2/30; C08F 210/02; C08F 220/18; C08F 263/04
USPC .................................. 524/561, 457; 526/328
See application file for complete search history.

(56) References Cited

U.S. PATENT DOCUMENTS

| | | | |
|---|---|---|---|
| 7,078,455 B2 | 7/2006 | Heldmann et al. | |
| 2007/0244238 A1 | 10/2007 | Desor et al. | |
| 2009/0043035 A1* | 2/2009 | Cabrera | C08F 2/22 524/457 |
| 2009/0069495 A1* | 3/2009 | Fichtner | C09D 5/024 524/555 |
| 2009/0203814 A1 | 8/2009 | Petri et al. | |

FOREIGN PATENT DOCUMENTS

| | | | |
|---|---|---|---|
| EP | 2025688 A2 | 2/2009 | |
| JP | 2002348339 A | * 12/2002 | |

OTHER PUBLICATIONS

Translation to Shibata JP 20023489339 (2002).*

* cited by examiner

*Primary Examiner* — Robert Jones, Jr.
(74) *Attorney, Agent, or Firm* — Roberts Mlotkowski Safran Cole & Calderon P.C.

(57) ABSTRACT

In a multi-stage emulsion polymerization process, a first monomer composition comprising from about 60 weight percent to about 95 weight percent of at least one vinyl ester, and from about 5 weight percent to about 40 weight percent ethylene is polymerized in a first stage under ethylene pressure to produce a first stage product having a $T_g$ of less than 20° C. Then, in a second stage, a second monomer composition comprising at least 95 weight percent of a meth(acrylic)ester or a mixture of at least two different (meth)acrylic esters is polymerized in the presence of said first stage product, wherein the (meth)acrylic ester(s) is selected such that the polymer produced by said second monomer composition has a $T_g$ of 5 to 90° C.

19 Claims, 1 Drawing Sheet

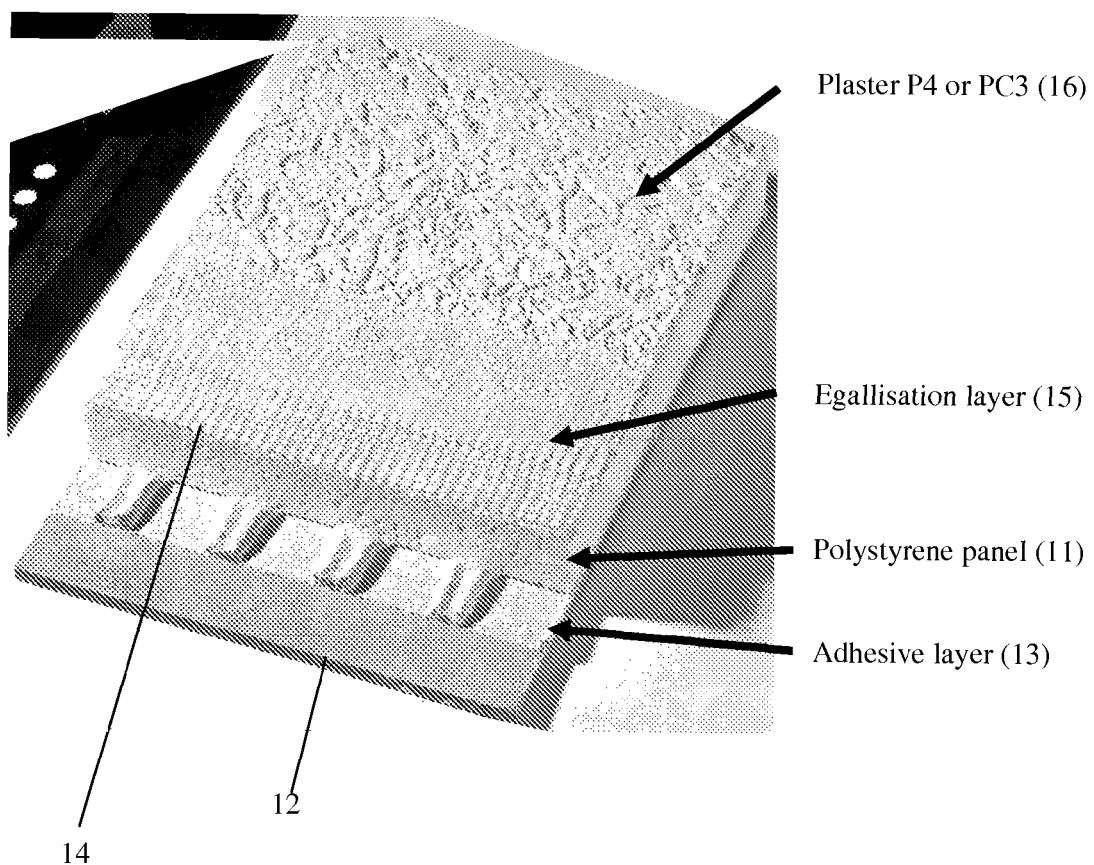

POLYMER DISPERSIONS, THEIR PREPARATION AND USE

CROSS-REFERENCE TO RELATED APPLICATIONS

The present Application is a U.S. National Phase of PCT/IB2012/003018 filed on Dec. 19, 2012 which claims benefit of the filing date of U.S. provisional application No. 61/578,941 filed on Dec. 22, 2011. The disclosure of the PCT Application is hereby incorporated by reference into the present Application.

FIELD

The present invention relates to polymer dispersions, their preparation and use. More particularly, this invention relates to vinyl ester-ethylene/acrylic multistage emulsions demonstrating enhanced wet scrub resistance, enhanced color retention, low water take up (measured as water permeability or w-value), low dirt pick up, high color retention and superior fire retardant properties when used, for example, in paints and plasters.

BACKGROUND

Polymer dispersions derived from vinyl esters and monomers copolymerizable therewith and their use as binders for paints and plasters are known and have already been described many times. Such polymer dispersions are typically prepared by emulsion polymerization; with the polymerization being effected in one or more stages. In the polymerization processes which have become known to date, monomer mixtures are converted by free-radical polymerization by addition of initiators in the presence of protective colloids and/or emulsifiers.

U.S. Patent Application Publication No. 2009/0069495 to Fichtner et al. ("Fichtner") is directed to coating compositions comprising binders based on polyvinyl ester dispersions prepared by a multistage polymerization process. In a first stage, a polyvinyl ester dispersion is prepared by polymerizing at least one vinyl ester of a saturated carboxylic acid (and optionally further monomers copolymerizable therewith) in the presence of at least one emulsifier and/or at least one protective colloid. In a second stage, monomers in a dissolved form, a pure form, or in the form of an emulsion are added to the reaction mixture and polymerized. The polyvinyl ester dispersions of Fichtner comprise polymerized silanes and/or epoxides, and are said to offer high weathering resistance when used in plasters, exterior coatings, like façade paints and wood protection paints and dispersion based paints. However, the dispersions of Fichtner suffer from the disadvantage of producing coatings with high water permeability (w-value).

U.S. Patent Application Publication No. 2009/0203814 to Petri et al. ("Petri") discloses multistage polymers derived from hard and soft monomer compositions containing vinyl esters, of which at least one monomer composition must contain an unsaturated organosilicon compound. The dispersions of Petri are suitable for the formation of solvent-free coating materials which exhibit little foam formation and are said to offer improved blocking resistance, gloss and abrasion resistance in coatings produced therewith. However, the dispersions of Petri suffer from the disadvantage of a high dirt pick behavior when those dispersions are used in exterior façade paints and exterior plasters.

U.S. Patent Application Publication No. 2007/0244238 to Desor et al. ("Desor") is directed to polymer dispersions prepared by emulsion polymerization containing at least two copolymers, A and B, with glass transition temperatures differing by at least 10° C. In emulsion polymerization, usually one or more emulsifiers are used. Attempts have been made to avoid the use of alkylphenol ethoxylates ("APEO") as nonionic emulsifiers due to health and environmental concerns. Accordingly, Desor's dispersions either contain no alkylphenol ethoxylates ("APEO"), or contain such small amounts thereof to be suitable for the preparation of wood varnishes, glazes and gloss paints. An APEO-free emulsifier is also provided by Desor, which ensures a desired shear stability of multistage polymer dispersions, and does not adversely affect the blooming and water resistance of the dispersion. However, the emulsions described in US 2007/0244238 display insufficient fire retarding properties when those emulsions are used in plaster formulations for thermal insulation systems, especially external insulation finishing systems (EIFS), U.S. Pat. No. 7,078,455 to Heldmann et al. ("Heldmann") is directed to aqueous plastic material dispersions based on vinyl ester copolymers. More particularly, Heldmann's dispersion is based on a vinyl ester copolymer having a solid content of up to 80% by weight substantially stabilized by ionic components, and a minimum film formation temperature (MFFT) of less than 20° C. However, the dispersions of Heldmann suffer from the disadvantage of a high dirt pick behavior when the dispersions are used in exterior façade paints and exterior plasters.

Notwithstanding the availability of the above types of polymer dispersions, there remains a persistent need for polymer dispersions which offer enhanced performance over existing compositions when used in, for example, paints and plasters. As an example, a significant disadvantage of coatings for use in exterior façade paints and plasters is high water permeability, measured as w-value according to DIN EN 1062-3. Therefore, it would be useful to provide polymer dispersions capable of use in, for example, paints and plasters, that offer reduced water take up, without loss of properties in other performance areas, like fire retardant properties.

The present invention addresses these and other needs by providing polymer dispersions for use in, for example, paints and plasters, which offer enhanced wet scrub resistance, enhanced color retention, low water take up (w-value), low dirt pick up, high color retention and superior fire retardant properties. More specifically, the present invention is directed to vinyl ester-ethylene acrylic dispersions prepared in a multistage polymerization process involving at least a first stage and a second stage. Moreover, the dispersions can be formulated into coating compositions without the use of coalescent agents, which is important for producing low VOC coatings Films and coatings formed from these polymer emulsions exhibit low dirt pick up and color retention and at the same time have a low w-value. This w-value can be determined according to DIN EN 1062-3. In addition, films and coatings formed from the present polymer emulsions exhibit good fire retardancy and high wet scrub resistance. Further the emulsions are coalescent free and allow low volatile organic compound formulation process capability.

SUMMARY

Accordingly, the invention resides in one aspect in an emulsion polymerization process comprising:

(a) polymerizing, in a first stage and under ethylene pressure, a first monomer composition comprising from about 60 weight percent to about 95 weight percent of at least one vinyl ester, and from about 5 weight percent to about 40 weight percent ethylene to produce a first stage product having a $T_g$ of less than 25° C., such as from −10 to 15° C.; and (b) polymerizing, in a second stage and in the presence of said first stage product, a second monomer composition comprising at least 95 weight percent a (meth)acrylic ester or of a mixture of at least two different (meth)acrylic esters selected such that the polymer produced by said second monomer composition has a $T_g$ from 5 to 90° C., such as from 10 to 75° C.

Preferably, the copolymer produced by said first monomer composition has a lower $T_g$ than the polymer produced by said second monomer composition.

Conveniently, the at least one vinyl ester of said first monomer composition comprises vinyl acetate.

In one embodiment, the second monomer composition comprises at least 95 weight percent of ethyl methacrylate, butyl methacrylate, butyl acrylate and mixtures thereof. In another embodiment, the second monomer composition comprises at least 95 weight percent of a mixture of methyl methacrylate with an acrylic ester chosen from the group consisting of butyl acrylate and ethylhexyl acrylate.

Conveniently, one or both the first and second monomer compositions further comprises from 0.05 weight percent to about 5 weight percent of at least one of an ethylenically unsaturated mono- and/or dicarboxylic acid, an ethylenically unsaturated sulfonic acid, an ethylenically unsaturated phosphoric acid, an ethylenically unsaturated phosphonic acid, and an amide of an ethylenically unsaturated mono- and/or dicarboxylic acid.

Conveniently, one or both the first and second monomer compositions further comprises at least one monomer selected from the group consisting of ethylenically unsaturated hydrolysable silicon compounds, ethylenically unsaturated epoxide compounds, epoxy silane compounds, ethylenically unsaturated 1,3-dicarbonyl compounds, di or polyethylenically unsaturated monomers, unsaturated carboxamides, and unsaturated ethylene urea compounds.

In further aspects the invention resides in a copolymer emulsion produced by the process described herein and use of the copolymer emulsion in paints e.g. façade paints, wood protection paints, interior paints and gloss paints, plasters and thermal insulation systems.

BRIEF DESCRIPTION OF THE DRAWINGS

FIG. 1 is a partially sectional view of an exterior insulation finishing system (EIFS) according to Example 7.

DETAILED DESCRIPTION OF THE EMBODIMENTS

Described herein is a multistage emulsion polymerization process, in which a first monomer composition comprising from about 60 weight percent to about 95 weight percent of at least one vinyl ester, and from about 5 weight percent to about 40 weight percent ethylene is polymerized under ethylene pressure in a first stage to produce a first stage product having a $T_g$ of less than 25° C., such as from about −10 to about 15° C. A second monomer composition comprising at least 95 weight percent of a single meth(acrylic) ester or a mixture of at least two different (meth)acrylic esters selected such that the polymer produced by said second monomer composition has a $T_g$ of about 5 to about 90° C. is then polymerized, in a second stage and in the presence of said first stage product. Generally, the (meth) acrylic ester(s) in the second monomer composition is selected such that the polymer produced thereby has a $T_g$ of from about 10° C. to about 75° C., such as from about 15° C. to about 50° C. Preferably, the copolymer produced by the first monomer composition has a lower $T_g$ than the polymer produced by the second monomer composition.

The glass transition temperatures of the copolymers produced by the present process are calculated by the Fox Flory equation. In this respect, it will be appreciated that the glass transition temperatures of the copolymers can be adjusted by selection of the monomer combinations in a manner known per se by the person skilled in the art.

The first monomer mixture employed in the present process comprises from about 60 weight percent to about 95 weight percent, such as from about 65 weight percent to about 90 weight percent, based on the total monomers in the first monomer composition, of at least one vinyl ester of a carboxylic acid. Suitable vinyl esters include vinyl esters of straight-chain and/or branched aliphatic carboxylic acids having from one to eighteen carbon atoms. In addition, it is also possible to use vinyl esters of aromatic carboxylic acids.

The preferred monomers of this type include vinyl formate, vinyl acetate, vinyl propionate, vinyl butyrate, vinyl isobutyrate, vinyl pivalate, vinyl 2-ethylhexanoate, vinyl esters of saturated branched monocarboxylic acids having from 9 to 11 carbon atoms in the acid radical, such as VeoVa 9, VeoVA 10 and VeoVa 11, vinyl esters of relatively long-chain saturated or unsaturated fatty acids, for example vinyl laurate or vinyl stearate, and also vinyl esters of benzoic acid and substituted derivatives of benzoic acid such as vinyl p-tert-butylbenzoate. Vinyl acetate is particularly preferred.

In addition to the vinyl ester, the first monomer composition comprises ethylene in an amount from about 5 weight percent to about 40 weight percent, such as from about 10 weight percent to about 30 weight percent, of the total monomers in the first monomer composition.

Optionally, the first monomer composition further comprises from 0.05 weight percent to about 5 weight percent, based on the total monomers in the first monomer composition, of at least one acid monomer selected from at least one of an ethylenically unsaturated mono- and/or dicarboxylic acid and/or an amide thereof, an ethylenically unsaturated sulfonic acid, an ethylenically unsaturated phosphoric acid and an ethylenically unsaturated phosphonic acid. Generally, the acid monomer includes 3 to 8 carbon atoms, such as ethylenically unsaturated $C_3$-$C_8$ monocarboxylic acids and ethylenically unsaturated $C_4$-$C_8$ dicarboxylic acids, together with the anhydrides or amides thereof and the monoesters of ethylenically unsaturated $C_4$-$C_8$ dicarboxylic acids.

Examples of ethylenically unsaturated $C_3$-$C_8$ monocarboxylic acids include acrylic acid, methacrylic acid and crotonic acid, and the anhydrides and amides thereof. Examples of ethylenically unsaturated $C_4$-$C_8$ dicarboxylic acids include maleic acid, fumaric acid, itaconic acid and citraconic acid, and the mono- or bisamides thereof and their monoesters with $C_1$-$C_{12}$, preferably $C_1$-$C_4$, alkanols, such as, for example, monomethyl maleate and mono-n-butyl maleate.

Examples of suitable ethylenically unsaturated sulfonic acids include those having 2-8 carbon atoms, such as vinylsulfonic acid, 2-acrylamido-2-methylpropanesulfonic acid, 2-acryloyloxyethanesulfonic acid and 2-methacryloyloxyethanesulfonic acid, 2-acryloyloxy- and 3-methacryloyloxy-propanesulfonic acid and vinylbenzenesulfonic acid. Examples of suitable ethylenically unsaturated phosphonic acids also include those having 2-8 carbon atoms, such as vinylphosphonic acid.

In addition to or instead of said acids, it is also possible to use the salts thereof, preferably the alkali metal or ammonium salts thereof, particularly preferably the sodium salts thereof, such as, for example, the sodium salts of vinylsulfonic acid and of 2-acrylamidopropanesulfonic acid.

Further optional comonomers used in the first monomer composition are esters of α,β-unsaturated monocarboxylic acids and/or monoesters or preferably diesters of α,β-unsaturated dicarboxylic acids with primary, secondary and/or tertiary saturated monohydric alcohols having from 1 to 20 carbon atoms. These may, for example, be the methyl, ethyl, propyl, butyl or the 2-ethylhexyl esters of acrylic acid, of methacrylic acid and/or itaconic acid, or the corresponding monoesters or especially diesters of maleic acid, fumaric acid or citraconic acid, and also the esters of the mono- and/or dicarboxylic acids mentioned with cycloaliphatic or polycyclic alcohols and of fatty alcohols. These comonomers can be present in an amount up to 25% by weight, preferably up to 15% by weight, of the total monomers in the first monomer composition.

Further optional comonomers used in the first monomer composition are epoxy-functional, ethylenically unsaturated compounds, such as glycidyl methacrylate, glycidyl acrylate and/or vinylepoxycyclohexane. These comonomers can be present in an amount up to 10% by weight, preferably up to 5% by weight, of the total monomers in the first monomer composition.

Further optional comonomers used in the first monomer composition are silicone-functional, ethylenically unsaturated compounds such as acryloyloxyalkyltri(alkoxy)silanes and methacryloyloxyalkyltri(alkoxy)silanes, vinyltrialkoxysilanes and/or vinylalkyldialkoxysilanes. These comonomers can be present in an amount up to 5% by weight, preferably up to 3% by weight, preferably up to 1% by weight, of the total monomers in the first monomer composition.

Further optional comonomers used in the first monomer composition are polyethylenically unsaturated and hence crosslinking comonomers, for example diallyl phthalate, diallyl maleate, triallyl cyanurate, tetraallyloxyethane, divinylbenzene, butanediol 1,4-dimethacrylate, triethylene glycol dimethacrylate, divinyl adipate, allyl(meth)acrylate, vinyl crotonate, methylenebisacrylamide, hexanediol diacrylate, pentaerythritol diacrylate and trimethylolpropane triacrylate, or mixtures of two or more compounds from this group. These comonomers can be present in an amount up to 10% by weight, preferably up to 2% by weight, of the total monomers in the first monomer composition.

Further optional comonomers used in the first monomer composition are hydroxy-functional esters of unsaturated carboxylic acids, such as hydroxyethyl(meth)acrylate, hydroxypropyl(meth)acrylate and adducts thereof with ethylene oxide or propylene oxide. These comonomers can be present in an amount up to 10% by weight, preferably up to 5% by weight, of the total monomers in the first monomer composition.

Further optional comonomers used in the first monomer composition are ethylenically unsaturated compounds containing crosslinkable groups, such as carbonyl groups or N-methylol groups. Examples thereof are diacetoneacrylamide, allyl acetoacetate, vinyl acetoacetate, acetoacetoxyethyl(meth)acrylate, N-ethanol(meth)acrylamide, N-propanol(meth)acrylamide, (meth)acrylamide, allyl carbamate, acrylonitrile, the N-methylol esters, N-methylol alkyl ethers or Mannich bases of N-methylol(meth)acrylamide or N-methylolallyl carbamate, acrylamidoglycolic acid and/or salts thereof, methyl acrylamidomethoxyacetate, N-(2,2-dimethoxy-1-hydroxyethyl)acrylamide, N-dimethylaminopropyl(meth)acrylamide, N-methyl(meth)acrylamide, N-butyl(meth)acrylamide, N-cyclohexyl(meth)acrylamide, N-dodecyl(meth)acrylamide, N-benzyl(meth)acrylamide, p-hydroxyphenyl(meth)acrylamide, N-(3-hydroxy-2,2-dimethylpropyl)methacrylamide, ethylimidazolidone methacrylate or N-vinylformamide, N-vinylpyrrolidone. These comonomers can be present in an amount up to 5% by weight, preferably up to 3% by weight, of the total monomers in the first monomer composition.

As described below crosslinkable groups, such as carbonyl groups like acetoneacrylamide, allyl acetoacetate, vinyl acetoacetate, acetoacetoxyethyl(meth)acrylate are preferably used in combination with additives, such as dicarboxylic acid dihydrazides like adipidic acid dihydrazide.

In the second stage of the above described process, a second monomer composition comprising at least 95 weight percent of one or more methacrylic or acrylic esters is polymerized in the presence of the polymer from the first stage polymerization. The (meth)acrylic ester(s) of the second monomer composition is selected such that the homo- or copolymer produced thereby has a $T_g$ of 5 to 90° C. Thus, in one embodiment, the second monomer composition comprises at least 95 weight percent of a one or more (meth)acrylic esters, each of whose the homopolymer has a $T_g$ of 5 to 90° C., such as ethyl methacrylate ($T_g$ of 65° C.), butyl methacrylate ($T_g$ of 20° C.) or tert-butyl acrylate (Tg of 41° C.). In an alternative embodiment, the second monomer composition comprises at least 95 weight percent of a mixture of at least one soft acrylic monomer whose homopolymer has a $T_g$ of below about 0° C. and at least one hard acrylic monomer whose homopolymer has a $T_g$ of above about 65° C., in such a ratio with optional further monomers copolymerizable therewith that the resulting copolymer of the second stage polymerization has a glass transition temperature in the range from about 5° C. to about 90° C. A suitable second monomer composition in said alternative embodiment comprises at least 95 weight percent of a mixture of methyl methacrylate with an acrylic ester chosen from the group consisting of butyl acrylate and ethylhexyl acrylate.

Additional monomers can also be polymerized in the second stage. In principle, it is possible to use in the second stage any of the monomers mentioned above as useable in the first stage.

The additional monomer classes usable in the second stage are thus generally vinyl esters of straight-chain and/or branched aliphatic carboxylic acids having from one to eighteen carbon atoms, vinyl esters of aromatic carboxylic acids, ethylenically unsaturated aliphatic or cycloaliphatic hydrocarbons, vinylaromatics, especially styrene, α-methylstyrene, vinyltoluene and/or vinyl xylene, halogenated unsaturated aliphatic hydrocarbons, α,β-unsaturated mono- and/or dicarboxylic acids, ethylenically unsaturated sulfonic acids and/or phosphonic acids or salts thereof, esters of α,β-unsaturated monocarboxylic acids with primary, secondary and/or tertiary saturated monohydric alcohols having from 1 to 20 carbon atoms, monoesters or preferably diesters of α,β-unsaturated dicarboxylic acids with primary, secondary and/or tertiary saturated monohydric alcohols having from 1 to 20 carbon atoms, epoxy-functional ethylenically unsaturated compounds, silicone-functional ethylenically unsaturated compounds, polyethylenically unsaturated and hence crosslinking comonomers, hydroxy-functional esters of unsaturated carboxylic acids, and crosslinkable or selfcrosslinking ethylenically unsaturated comonomers. Preferred monomers are unsaturated copolymerizable carboxylic acids, unsaturated sulfonic acids, unsaturated phosphonic acids, unsaturated phosphoric acids, and carboxamides and their salts. Also preferred are ethylenically unsaturated hydrolysable silicon compounds, ethylenically unsaturated epoxide compounds, epoxy silane compounds, ethylenically unsaturated 1,3-dicarbonyl compounds, di or polyethylenically unsaturated monomers, unsaturated carboxamides, and unsaturated ethylene urea compounds.

Preferably, the weight ratio of the first monomer composition to the second monomer composition is in the range from 60:40 to 95:5.

The multistage dispersions produced by the present process may comprise at least one protective colloid and/or comprise at least one emulsifier.

Suitable protective colloids, i.e. polymeric stabilizers, are methylcelluloses, hydroxyethyl- and propylcelluloses, and also sodium carboxymethylcellulose, gelatin, casein, starch, gum arabic, hydroxy ethyl starch and sodium alginate.

The preferred protective colloid is polyvinyl alcohol. Suitable polyvinyl alcohol has a degree of hydrolysis of from 60 to 100 mol % and a viscosity of the 4% aqueous solution at 20° C. of 2-70 mPa*s, especially from 30 to 70 mPa*s.

The protective colloids mentioned can of course also be used in the form of mixtures.

When protective colloids are used, the amount thereof, based on the total amount of monomers used, is typically from 0.1 to 5 parts by weight, preferably from 0.3 to 5 parts by weight.

In a preferred variant, the present dispersions contain no protective colloid at all, or the amount of protective colloid, based on the total amount of monomers used, is less than 1% by weight, more preferably less than 0.7% by weight.

The emulsifiers used are generally nonionic emulsifiers or combinations of nonionic with ionic emulsifiers.

Examples of nonionic emulsifiers are acyl, alkyl, oleyl and alkylaryl ethoxylates. These products are, for example, commercially available under the name Genapol® or Lutensol®. They include, for example, ethoxylated mono-, di- and trialkylphenols (EO: from 3 to 50, alkyl substituted radical: $C_4$ to $C_{12}$) and ethoxylated fatty alcohols (EO: from 3 to 80; alkyl radical: $C_8$ to $C_{36}$), especially $C_{12}$-$C_{14}$-fatty alcohol (3-8) ethoxylates, $C_{13}$-$C_{15}$-oxo alcohol (3-30)ethoxylates, $C_{16}$-$C_{18}$-fatty alcohol (11-80)ethoxylates, $C_{1-10}$-oxo alcohol (3-11)ethoxylates, $C_{1-3}$-oxo alcohol (3-20) ethoxylates, polyoxyethylene sorbitanmonooleate with 20 ethylene oxide groups, copolymers of ethylene oxide and propylene oxide with a minimum content of 10% by weight of ethylene oxide, the polyethylene oxide (4-20) ethers of oleyl alcohol and the polyethylene oxide (4-20) ethers of nonylphenol. Particularly suitable are the polyethylene oxide (4-20) ethers of fatty alcohols, especially of oleyl alcohol.

When nonionic emulsifiers are used, the amount thereof, based on the total amount of monomers used, is typically from 0.05 to 10 parts by weight, preferably from 0.5 to 7.0 parts by weight, more preferably from 0.5 to 5 parts by weight and most preferably from 1.0 to 3.5 part by weight. It is also possible to use mixtures of nonionic emulsifiers.

Instead of or in addition to nonionic emulsifiers, it is possible to use ionic emulsifiers, preferably anionic emulsifiers.

Examples include sodium, potassium and ammonium salts of straight-chain aliphatic carboxylic acids of chain length $C_{12}$-$C_{20}$, sodium hydroxyoctadecanesulfonate, sodium, potassium and ammonium salts of hydroxy fatty acids of chain length $C_{12}$-$C_{20}$ and their sulfation and/or acetylation products thereof, alkyl sulfates, also in the form of triethanolamine salts, alkyl-($C_{10}$-$C_{20}$)-sulfonates, alkyl ($C_{10}$-$C_{20}$)-arylsulfonates, dimethyldialkyl-($C_8$-$C_{18}$)-ammonium chloride, and sulfation products thereof, alkali metal salts of sulfosuccinic esters with aliphatic saturated monohydric alcohols of chain length $C_4$-$C_{16}$, sulfosuccinic 4-esters with polyethylene glycol ethers of monohydric aliphatic alcohols of chain length $C_{10}$-$C_{12}$ (disodium salt), sulfosuccinic 4-esters with polyethylene glycol nonylphenyl ether (disodium salt), sulfosuccinic acid biscyclohexyl ester (sodium salt), lignosulfonic acid and the calcium, magnesium, sodium and ammonium salts thereof, resin acids, hydrogenated and dehydrogenated resin acids and alkali metal salts thereof, sodium (dodecylated diphenyl ether) disulfonate and sodium laurylsulfate, or ethoxylated sodium lauryl ether sulfate (3 EO). It is also possible to use mixtures of ionic emulsifiers.

When ionic emulsifiers are used, the amount thereof, based on the total amount of monomers used, is typically from 0.05 to 10 parts by weight, preferably from 0.05 to 5.0 parts by weight, more preferably from 0.05 to 3.65 parts by weight and most preferably from 0.1 to 1 part by weight. It is also possible to use mixtures of ionic emulsifiers.

When emulsifiers are used, the total amount thereof, based on the total amount of the monomers used, is typically from 0.05 to 10 parts by weight, preferably from 0.05 to 5.0 parts by weight, more preferably from 0.05 to 3.65 parts by weight and most preferably from 0.1 to 1 part by weight.

The multi-stage emulsion polymerization of the present process can be carried out for example, by inclusion polymerization, as described in US 2009/0069495. In such a process, the first polymerization stage is conducted until at least 90% of the monomers in the first monomer composition have been polymerized. The second monomer composition in pure form or in the form of a solution or an emulsion is then added followed by an initiator for the second stage polymerization. In this way, the monomers of the second monomer composition may diffuse into polymer particles from the first stage before polymerizing themselves.

Particular preference is given to using multistage dispersions in which the monomers in the second stage are used in pure form. A partition equilibrium is established between the monomers added in the second stage and the reaction product of the first stage. The monomers hydrophobic with respect to water which are added in the second stage probably diffuse fully into the polymer particles prepared in the first stage and are polymerized into these particles. This form of emulsion polymerization is therefore also referred to as inclusion polymerization.

The start of the second polymerization (second stage) can be effected immediately after the addition of the monomer(s) in the second stage, or the polymerization mixture may be left to stand for a further period, for example from 10 to 60 minutes, before initiator is added.

Moreover, the glass transition temperatures of the dispersions prepared by inclusion polymerization differ from the glass transition temperatures of dispersions comprising particles of the same monomer composition which have been prepared by conventional one-stage emulsion polymerization.

Each stage of the multi-stage polymerization of the present process is conducted by free-radical emulsion polymerization. The free-radical emulsion polymerization in the first stage can be carried out in a manner known per se in a batchwise process, in a feed process, in a combined batchwise/feed process or in a continuous process. In the first stage, preference is given to working in a combined batchwise/feed process and particular preference to working in a feed process, in which case an amount of the monomers used in the first stage, for example from 1 to 15% by weight, is typically initially charged to start the polymerization. The monomers can be metered in either together or in separate feeds. The first stage is polymerized under ethylene pressure, which can be varied during the feeding of the monomers. In addition, it may be advantageous in particular embodiments to establish specific particle sizes and particle size distributions at the start of the first stage by performing a seed polymerization.

The emulsifier and/or the protective colloid also used for stabilization can be initially charged completely at the start of the first stage, or can be initially charged in part and metered in part, or can be metered in completely during the performance of the first stage.

The polymerization temperature during the first stage varies typically within the range from 20 to 120° C., preferably within the range from 30 to 110° C. and most preferably within the range from 45 to 95° C.

To start the polymerization, the initiators of free radical polymerization known per se can be used. Examples thereof are hydrogen peroxide, benzoyl peroxide, cyclohexanone peroxide, isopropylcumyl hydroperoxide, persulfates of potassium, sodium and ammonium, peroxides of evennumbered saturated monobasic aliphatic carboxylic acids of chain length $C_8$-$C_{12}$, tert-butyl hydroperoxide, di-tert-butyl peroxide, diisopropyl percarbonate, azoisobutyronitrile, acetylcyclohexanesulfonyl peroxide, tert-butyl perbenzoate, tert-butyl peroctoate, bis(3,5,5-trimethyl)hexanoyl peroxide, tert-butyl perpivalate, hydroperoxypinane, p-menthane hydroperoxide. The aforementioned compounds can also be used within a redox system, in which case it is also possible to use transition metal salts such as iron(II) salts, or other reducing agents. The reducing agents or regulators used may also be alkali metal salts of oxymethanesulfinic acid, mercaptans of chain length $C_{10}$-$C_{14}$, buten-(I)-ol-(3), hydroxylamine salts, sodium dialkyldithiocarbamate, sodium bisulfite, ammonium bisulfite, sodium dithionite, diisopropylxanthogen disulfide, ascorbic acid, tartaric acid, isoascorbic acid, boric acid, urea and formic acid.

However, preference is given to using water-soluble persulfates, especially ammonium persulfate or sodium persulfate, to initiate the polymerization.

The initiator for the polymerization used in the first stage can be added completely to the reaction mixture at the start of the first stage or can be added in part or metered in part in the course of the first stage or can be metered in completely during the performance of the first stage.

After the complete or virtually complete conversion of at least 90%, preferably at least 95%, of the monomers used in the first stage, the second stage is commenced.

To this end, the entire amount of the monomers provided for the next stage of the polymerization process is added in pure form, in the form of a solution or in the form of a monomer emulsion to the polymerization mixture obtained in the first stage. In this step too, the monomers can be metered in either together or in separate feeds. The duration for the addition varies typically within the range from 5 to 60 minutes, preferably from 15 to 30 minutes.

The emulsion polymerization of the second stage can be performed with or without a pre-emulsion, preferably without a pre-emulsion.

In the second stage, further emulsifier and/or further protective colloid can be initially charged completely at the start of the second stage or during the second stage, can be initially charged in part and metered in part, or can be metered in completely during the performance of the second stage.

The monomers are added to the reaction mixture in the second stage in pure form or in the form of solutions in organic solvents or in the form of an emulsion, especially an aqueous emulsion. Preference is given to adding the monomers to the reaction mixture in liquid and pure form.

After the addition of the monomers in the second stage polymerization can be commenced by adding the initiator. This can be done immediately after the second stage has ended or after a rest phase of, for example, from 15 to 120 minutes. It is assumed that the monomers supplied in the second stage can be distributed in or on the polymer particles formed in the first stage during the performance of the second stage and within any rest phase which follows.

To restart the polymerization in the second stage of the process, the initiators of free-radical polymerization known per se can be used. Examples thereof are listed above in the description of the first stage.

In this case too, the initiator for the polymerization in the second stage can be added completely to the reaction mixture at the start of the second stage or can be added in part and metered in part in the course of the second stage or can be metered in completely during the performance of the second stage.

The polymerization temperature during the second stage varies typically within the range from 20 to 120° C., preferably within the range from 30 to 110° C. and most preferably within the range from 45 to 95° C.

Before starting the second stage of the polymerization, it is advisable to increase the temperature of the reaction mixture before or during the addition of the initiator.

On completion of polymerization in the second stage, for demonomerization, a further, preferably chemical aftertreatment, especially with redox catalysts, for example combinations of the abovementioned oxidizing agents and reducing agents, may follow. In addition, residual monomer present can be removed in known manner, for example by physical demonomerization, i.e. distillative removal, especially by means of steam distillation, or by stripping with an inert gas. A particularly efficient combination is one of physical and chemical methods, which permits lowering of the residual monomers to very low contents (<1000 ppm, preferably <100 ppm).

The aqueous multistage dispersions produced by the present process typically have a solids contents of from 20 to 70% by weight, preferably from 30 to 65% by weight and more preferably from 40 to 60% by weight, and a pH between 2 and 7, preferably between 2.5 and 6.

The aqueous multistage polyvinyl ester dispersions described herein are stable fluid systems which can be used to produce coating compositions suitable for coating a multitude of substrates. Suitable substrates are, for example, wood, concrete, metal, glass, ceramics, plastic, plasters, wallpaper, other paper, or painted, primed or weathered substrates. The coating composition is applied to the substrate to be coated in a manner dependent on the configuration of the coating composition. The application can, depending on the viscosity and the pigment content of the formulation and on the substrate, be effected by means of rolling, brushing, knife coating, dipping or as a spray.

Preferred uses of such coating compositions are in plasters and renders, and in façade paints, wood protection paints and interior paints, particularly solvent- and plasticizer-free paints. When used in such applications, the aqueous multistage dispersions produced by the present process is typically combined with one or more conventional fillers and/or pigments. In this context, pigments are understood as meaning solids which have a refractive index greater than or equal to 1.75, whereas fillers are understood as meaning solids which have a refractive index of less than 1.75.

Examples of mineral fillers are alkaline earth metal oxides, alkaline earth metal carbonates and/or silicate fillers, in particular calcium carbonate, mica, feldspar, kaolin, quartz powders and/or particulate quartz fractions and marble powders and/or particulate marble fractions. When used in plasters and renders, the filler generally has a particle size of at least 40 μm, whereas when used in a paint, the filler typically has a size of 1 to 40 μm.

Pigments may be any inorganic or organic and may be color-imparting or opaque finely divided solids. Preferred pigments have a mean diameter for the primary particle of less than or equal to 1 μm, preferably from 0.1 to 0.5 μm, determined by sedimentation analysis according to DIN 66115. Examples of inorganic pigments are metal oxides, such as titanium dioxide, iron oxide or zinc oxide, in particular titanium dioxide. Examples of organic pigments are phthalocyanines, in particular phthalocyanine blue, or diaryl pigments, azo pigments or quinacridone pigments.

To disperse the fillers and pigments in water, auxiliaries based on anionic or nonionic wetting agents, such as preferably, for example, sodium pyrophosphate, sodium polyphosphate, naphthalenesulfonate, sodium polyacrylate, sodium polymaleinates and polyphosphonates such as sodium 1-hydroxyethane-1,1-diphosphonate and sodium nitrilotris(methylenephosphonate), may be added.

Thickeners may also be added to the coating compositions described herein. Thickeners which may be used include, inter alia, cellulose derivates such as methylcellulose (MC), hydroxyethylcellulose (HEC) and carboxymethyl-cellulose. Other thickeners which may be used include casein, gum arabic, gum tragacanth, starch, sodium alginate, polyvinyl alcohol, polyvinylpyrrolidone, sodium polyacrylate and water-soluble copolymers based on acrylic and methacrylic acid, such as acrylic acid/acrylamide and methacrylic acid/acrylic ester copolymers. Hydrophobically-modified alkali soluble (acrylic) emulsions (HASE), hydrophobically-modified ethoxylate (poly)urethanes (HEUR), and polyether polyols (PEPO) are also available. Inorganic thickeners, such as, for example, bentonites or hectorite, may also be used.

For various applications, it is sometimes also desirable to include small amounts of other additives, such as bactericides, pH modifiers, and antifoamers, incorporated in the latex paint compositions herein. This may be done in a conventional manner and at any convenient point in the preparation of the latexes.

The coating compositions may also comprise crosslinking additives. Such additives may be: aromatic ketones, for example alkyl phenyl ketones, which may have one or more substituents on the phenyl ring, or benzophenone and substituted benzophenones as photoinitiators. Photoinitiators suitable for this purpose are disclosed, for example, in DE-A-38 27 975 and EP-A-0 417 568. Suitable crosslinking compounds are also water-soluble compounds having at least two amino groups, for example dihydrazides of aliphatic dicarboxylic acids, as disclosed, for example, in DE-A-39 01 073, when the vinyl ester copolymer contains monomers containing carbonyl groups in copolymerized form.

It addition, it is possible to use, in the coating compositions, as further additives, waxes based on paraffins and polyethylene, and matting agents, defoamers, preservatives or hydrophobicizing agents, UV stabilizers, biocides, fibers, plasticizers and further additives known to those skilled in the art. Examples of plasticizers are dimethyl phthalate, diisobutyl phthalate, diisobutyl adipate, Coasol B® and Plastilit 3060®. Preferably no coalescent agents and plasticizers are used. Examples of defoamers are mineral oil defoamers or silicone defoamers. Examples of UV stabilizers are sterically hindered piperidine compounds (HALS) or benzophenone derivatives.

Paint compositions produced from the polymer emulsions described herein typically have a minimum film forming temperature (MFFT) of less than 5° C. and produce coatings having a low water up take value (w), preferably less than 0.15 kg/(m² h$^{0.5}$), and a high outdoor weathering resistance, comparable to emulsion paints comprising binders based on straight acrylate. The present emulsions can also be used in interior paints especially for satin and semi gloss paints where a good block resistance is required.

Wood protection paints produced from the emulsions herein show a good block resistance and high elasticity. This application profile is especially needed when coatings are applied on substrates which change their dimensions during weathering like wood.

The aqueous multistage polyvinyl ester dispersions described herein can also be used as binders for plaster compositions of all kinds, such as synthetic resin-bound plasters, paste-form tile adhesives, paste-form sealants and paste-form sealing compositions, as well as plaster-coated thermal insulation systems. Thermal insulation systems utilizing the present coating compositions have excellent flame retardant properties including a fire gradient (figra) values of less than about 120 W/S when tested in accordance with DIN EN 13823 (SBI Test) and a residual length of less than 15 centimeters, when tested in accordance with German DIN 4102 (Brandschachttest).

The following non-limiting Examples and drawing serve to illustrate the invention. The parts and percentages reported in the examples are based on weight, unless stated otherwise.

EXAMPLES

Synthesis of Emulsions

Example E1

VAE with a Second Stage (Inclusion Phase) Comprising a Mixture of Methyl Methacrylate and Butyl Acrylate with a $T_g$ of 74° C.

An aqueous solution consisting of the following ingredients was introduced into a pressure reactor having a stirrer, jacket heating and metering pumps: 25755 g of water, 84 g of sodium acetate, 1430 g of a 70% active aqueous solution of an alkyl ethoxylate having 30 mol of ethylene oxide, 1112 g of 15% active sodium lauryl sulphate, 555 g of a 30% active aqueous sodium vinylsulphonate, 890 g of a 15% active aqueous polyvinyl alcohol solution, 13.5 g of sodium metabisulfite and 0.08 g of $(NH_4)_2Fe(SO_4)_2$.

The atmosphere inside the reactor was freed from oxygen and ethylene was pressurized in the reactor. At an ethylene pressure of 15 bar, a mixture of 14 g of vinyl triethoxysilane and 1707 g of vinylacetate, as well as 665 g of a 11% sodium persulphate aqueous solution was metered in. The system was heated up to internal temperature of 65° C. At 65° C., the pressure was raised to 35 bar and a mixture of 186 g of vinyltriethoxysilane and 22680 g of vinylacetate was metered in 210 minutes. The pressure was kept at 35 bar until 3420 g of ethylene was in the reactor. Jacket cooling was applied to remove the heat of reaction. After 210 minutes, a mixture of 4777 g methyl methacrylate and 777 g of butylacrylate, as well as 625 g of a 5.5% sodium persulphate aqueous solution was added in 30 minutes. The temperature was raised to 85° C. and kept for 1 hour after all additions, and then the system was cooled down. The resulting dispersion was filtered, and had a solid content of 54% and the measured MFFT was 0° C.

Example E2

VAE with a Second Stage (Inclusion Phase) Comprising a Mixture of Methyl Methacrylate and 2-Ethylhexyl Acrylate with a $T_g$ of 78° C.

The water phase and VAE polymerization were carried out as in Example 1, with the only difference being in the second stage. In this case, after the 210 minutes of VAE polymerization, a mixture of 4995 g of methyl methacrylate and 555 g of 2-ethylhexyl acrylate as well as 625 g of a 5.5% sodium persulphate aqueous solution was added in 30 minutes. The temperature was raised to 85° C. and kept for 1 hour after all additions, and then the system was cooled down. The resulting dispersion was filtered, and had a solid content of 54% and the measured MFFT was 0° C.

Example E3

VAE with a Second Stage (Inclusion Phase) Comprising a Mixture of Methyl Methacrylate and 2-Ethylhexyl Acrylate with a $T_g$ of 55° C.

The water phase and VAE polymerization were carried out as in Example 1, with the only difference being in the second stage. In this case, after the 210 minutes of VAE polymerization, a mixture of 4440 g of methyl methacrylate and 1110 g of 2-ethylhexyl acrylate as well as 625 g of a 5.5% sodium persulphate aqueous solution was added in 30 minutes. The temperature was raised to 85° C. and kept for 1 hour after all additions, and then the system was cooled down. The resulting dispersion was filtered, and had a solid content of 54% and the measured MFFT was 0° C.

Example E4

VAE with a Second Stage (Inclusion Phase) Comprising a Mixture of Methyl Methacrylate and 2-Ethylhexyl Acrylate with a $T_g$ of 35° C.

Again the water phase and VAE polymerization were carried out as in Example 1, with the only difference being in the second stage. In this case, after the 210 minutes of VAE polymerization, a mixture of 3885 g of methyl methacrylate and 1665 g of 2-ethylhexyl acrylate as well as 625 g of a 5.5% sodium persulphate aqueous solution was added in 30 minutes. The temperature was raised to 85° C. and kept for 1 hour after all additions, and then the system was cooled down. The resulting dispersion was filtered, and had a solid content of 54% and the measured MFFT was 0° C.

Example E5

VAE with a Second Stage (Inclusion Phase) as a Mixture of Methyl Methacrylate and 2-Ethylhexyl Acrylate a $T_g$ of 17° C.

Again the water phase and VAE polymerization were carried out as in Example 1, with the only difference being in the second stage. In this case, after the 210 minutes of VAE polymerization, a mixture of 3330 g of methyl methacrylate and 2220 g of 2-ethylhexyl acrylate as well as 625 g of a 5.5% sodium persulphate aqueous solution was added in 30 minutes. The temperature was raised to 85° C. and kept for 1 hour after all additions, and then the system was cooled down. The resulting dispersion was filtered, and had a solid content of 54% and the measured MFFT was 0° C.

Comparative Example C1

VAE with a Second Stage (Inclusion Phase) as Only Methyl Methacrylate, $T_g$ of 105° C.

Again the water phase and VAE polymerization were carried out as in Example 1, with the only difference being in the second stage. In this case, after the 210 minutes of VAE polymerization, 5550 g of methyl methacrylate as well as 625 g of a 5.5% sodium persulphate aqueous solution was added in 30 minutes. The temperature was raised to 85° C. and kept for 1 hour after all additions, and then the system was cooled down. The resulting dispersion was filtered, and had a solid content of 54% and the measured MFFT was 0° C.

Comparative Example C2

VAE with a Second Stage (Inclusion Phase) Comprising a Mixture of Methyl Methacrylate and Butyl Acrylate with a $T_g$ of 0° C.

Again the water phase and VAE polymerization were carried out as in Example 1, with the only difference being in the second stage. In this case, after the 210 minutes of VAE polymerization, a mixture of 2218 g of methyl methacrylate and 3336 g of butyl acrylate as well as 625 g of a 5.5% sodium persulphate aqueous solution was added in 30 minutes. The temperature was raised to 85° C. and kept for 1 hour after all additions, and then the system was cooled down. The resulting dispersion was filtered, and had a solid content of 54% and the measured MFFT was 0° C.

Comparative Example C3

Two Stage (Meth)Acrylic Ester-Styrene Copolymer Emulsion Polymerized without Ethylene Pressure A 3 liter reactor equipped with a condenser and anchor stirrer was filled with 576.0 g of water and 18.0 g of a sodium alkyl ether sulfate (28%, 7 EO). The reactor content was heated to 80° C. and 4.5% of Feed 1 was added. A solution of 0.66 g sodium persulfate in 15.5 g of water was added and the reactor contents were held at 80° C. for 15 minutes. The remaining part of Feed 1 and afterwards Feed 2 were added in parallel with Feed 3 over 210 minutes.

The reactor temperature during the addition of feeds was maintained at 80° C. After completion of the feeds, the reactor content was held at 80° C. for another 60 minutes and then cooled to room temperature. The pH of the emulsion was adjusted with ammonia (12.5% solution) to a pH value 8.0. The resulting dispersion was filtered, and had a solid content of 50% and the measured MFFT was 0° C.

| Feed 1 | | |
|---|---|---|
| Water | [g] | 285.2 |
| Sodium alkyl ether sulfate (28%, 7 EO) | [g] | 19.7 |
| Methacrylic Acid | [g] | 19.8 |
| Styrene | [g] | 198.0 |
| 2-Ethylhexyl Acrylate | [g] | 462.0 |
| Feed 2 | | |
| Water | [g] | 228.8 |
| Sodium alkyl ether sulfate (28%, 7 EO) | [g] | 16.2 |
| Methacrylic Acid | [g] | 5.4 |
| Styrene | [g] | 54.0 |
| Methyl Methacrylate | [g] | 351.0 |
| 2-Ethylhexyl Acrylate | [g] | 135.0 |
| Feed 3 | | |
| Water | [g] | 50 |
| Sodium Persulfate | [g] | 4.2 |

Comparison Example C4

Standard VAE, Mowilith LDM 1871

This Example employed a commercial vinyl acetate ethylene copolymer dispersion from Celanese Emulsions having only one polymer phase with a Tg of 11° C., a MFFT of 0° C. and a solids content of 53%

Example 6

Production of Plasters

Plasters P1, P2, P3, P4, and P5 were prepared according to the following recipe given in Table 1 using the emulsion E1 for plaster P1, E2 for plaster P2, E3 for plaster P3, E4 for plaster P4 and E5 for plaster P5. Similarly, comparison plasters PC1, PC2, PC3 and PC4 were prepared according to the following recipe given in Table 1 using the emulsion C1 for comparison plaster PC1, the emulsion C2 for comparison plaster PC2, the emulsion C3 for comparison plaster PC3 and the emulsion C4 for comparison plaster PC4.

TABLE 1

| Constituents | Parts by weight |
|---|---|
| Water | 81.0 |
| Dispersant Mowiplus XW 330, approx. 30% | 3.0 |
| Thickener, Cellulosether Tylose MH 6000 YG8 | 0.7 |
| Dispersant Calgon N, 10% | 7.0 |
| Defoamer Agitan 218 | 3.0 |
| Emulsion as described above | 140.0 |
| Pigment, Titanium dioxide Kronos 2160 | 40.0 |
| Polyethylene fibres FPE 930 T | 3.0 |
| MicaCelia 250 L | 30.0 |
| Calcium carbonate, Omyacarb 40 GU | 130.0 |
| Calcium carbonate, Omyacarb 130 GU | 150.0 |
| Carolith 0.1-0.5 | 120.0 |
| Carolith 1.5-2.0 | 300.0 |
| NaOH, 10% | 1.3 |

TABLE 1-continued

| Constituents | Parts by weight |
|---|---|
| White spirit | 3.0 |
| Butyldiglycol acetate | 3.0 |
| | 1015.0 |

The water take up of each plaster was determined as a water permeability, w-value, according DIN EN 1062-3. A w-value <0.10 kg/(m$^2$ h$^{0.5}$) means a very good water resistance performance, a w-value between 0.10 and 0.150 kg/(m$^2$ h$^{0.5}$) means a good water resistance performance and a value of >0.15 kg/(m$^2$ h$^{0.5}$) means a poor water resistance performance.

To evaluate the weathering performance of the plasters, specimens were prepared by applying the plaster on a fibre cement panel. After drying for 48 hours, the $L_{start}$-value of the plaster surface was measured according DIN 6174 with a color guide spectrophotometer from BYK-Gardner. Afterwards the test specimens were laid out on a outdoor weathering station in Frankfurt Liederbach at an angle of 45° to south direction. After 6 months the $L_{6\ month}$ value of each plaster was measured as described for $L_{start}$. The delta-L value was calculated according the following equation:

$$\text{Delta } L = L_{start} - L_{6\ month}$$

The smaller the delta-L value, the smaller is the dirt pick up and the change in whiteness compared to the start value and therefore the better the outdoor performance. A delta-L value>7 after 6 months indicates a poor outdoor performance (high dirt pick up) whereas a delta L value of 0 to 7 means for a good outdoor performance.

The test results are summarized in Table 2.

TABLE 2

| Plaster sample | Delta L after 6 month 45° weathering south | Outdoor weathering performance | Water permeability w-value in kg/(m$^2$h$^{0.5}$) | Water resistance performance |
|---|---|---|---|---|
| P1 | 5.5 | Good | 0.07 | Very good |
| P2 | 5.6 | Good | 0.12 | good |
| P3 | 4.2 | Good | 0.12 | good |
| P4 | 4.8 | Good | 0.09 | Very good |
| P5 | 5.1 | Good | 0.09 | Very good |
| PC1 (Tg 100) | 4.8 | Good | 0.17 | bad |
| PC2 (Tg 0) | 7.2 | Bad | 0.05 | Very good |
| PC4 (LDM 1871) | 7.5 | Bad | 0.09 | Very good |

Example 7

Production of Exterior Insulation Finishing Systems (EIFS)

The emulsions of Example E4 and Comparative Example C3 were used in the production of the EIFS system shown in FIG. 1. The EIFS system comprises a 5 cm thick polystyrene panel 11 which on one major surface is bonded to a backing 12 by an adhesive layer 13. A reinforcing mesh 14 is secured to the opposite major surface of the panel 11 by a base layer 15 and a plaster coating 16 is applied on top of the base layer 15. A first EIFS system designated EIFS1 was produced using the emulsion of Example E4 as a binder for the adhesive layer 13 and the base layer 15 and by using the plaster P4 to produce the coating 16. By way of comparison a second EIFS system designated EIFS2 was produced using the emulsion of Comparative Example C3 as a binder for the adhesive layer 13 and the base layer 15 and by using the plaster PC3 to produce the coating 16. In each system, the adhesive layer 13 and the base layer 15 had the composition given in Table 3.

TABLE 3

| Constituents | Parts by weight |
|---|---|
| Emulsion E4 or C3 adjusted with water to 50% solid | 150.0 |
| Dispersant Mowiplus XW 330 | 3.0 |
| Dispersant Calgon N, 10% | 15.0 |
| Defoamer Agitan 218 | 1.0 |
| Apyral, Typ 22 | 100.0 |
| Calcium carbonate Omyacarb GU 15 | 90.0 |
| Calcium carbonate Omyacarb GU 40 | 140.0 |
| Calcium carbonate Omyacarb AL 130 | 120.0 |
| Micro Talc AT 1 | 30.0 |
| Quartz sand F 32 | 290.0 |
| Hectone H | 40.0 |
| Butyldiglykol acetate | 3.0 |
| Whire spirit | 5.0 |
| Water | 11.0 |
| NaOH, 10% | 2.0 |
| | 1000.0 |

The fire retarding properties of EIFS1 and EIFS2 were tested according the German DIN 4102 (Brandschachttest) and the results are summarized in Table 4.

TABLE 4

| Example | Residual length | Smoke gas temperature | Requirements for class B1 |
|---|---|---|---|
| EIFS 1 based on emulsion E4 | >15 cm | <200° C. | Fulfilled |
| EIFS 2 based on emulsion C3 | <15 cm | >200° C. | Failed |

In addition all the fire retardant parameters according to the European standard DIN EN 13823 (SBI Test), such as FIGRA (Fire gradient), THR (Total heat release), SMO-GRA (Smoke gradient) and TSP (Total smoke production) were measured and the results are given in Table 5.

TABLE 5

| Example | FIGRA[1] [W/S] | THR[2] [MJ] | SMO-GRA[3] [m$^2$/s$^2$] | TSP[3] [m$^2$] | Minimum requirements for class A2 s1 or B s1 according DIN EN 13501-1 fulfilled |
|---|---|---|---|---|---|
| EIFS1 | 102.5 | 3.96 | 0 | 27 | Yes |
| EIFS2 | 183.2 | 8.0 | 6.5 | 52.8 | No |

[1]Figra < 120 [W/S] required for class A2 and B
[2]THR< 7.5 [MJ] required for class A2 and B
[3]SMO-GRA < 30 [m$^2$/s$^2$] and TSP < 50 [m$^2$] needed for S1 classification Example 7

Interior Paints

Interior paints were prepared according to the following recipe given in Table 6 using the emulsion E4 for paint IP1 and emulsion E5 for paint IP2. As comparison a paint IPC3 was made with comparison emulsion C4.

TABLE 6

| Ingredients | p.b.w. |
|---|---|
| Water | 190.0 |
| Cellulose ether Tylose H 6000 YP2 | 4.5 |
| Polyphosphate Calgon N, 10% | 10.0 |
| Poly acrylic acid, Lopon LF | 3.0 |
| Defoamer Agitan 381 | 3.0 |
| Titanium dioxide Kronos 2190 | 190.0 |
| CaCO3 filler, Omyacarb extra-GU | 130.0 |
| NaOH, 10% | 2.0 |
| PU thickener, Cognis DSX 3800 | 4.5 |
| Defoamer, Agitan 381 | 3.0 |
| Emulsion E4, E5 or C4 adjusted with water to 50% solid content. | 460.0 |
| Total | 1000.0 |

The block resistance of the paints were measured as follows:

Microscope slides (76×26×1 mm) from Marienfeld were coated at a wet-film thickness of 200 μm. After drying for 24 hours at 23° C. and 50% humidity, two coated microscope slides were placed with their coated sides together and were subjected at 23° C. and 50% humidity for 1 hour to a force of 1 kg. Subsequently the force required to separate the microscope slides was determined in [g/6.25 cm]. The results are given in Table 7.

TABLE 7

| Interior Paint | Force to separate the blocked paint films in [g/6.25 cm$^2$] | Block resistance |
|---|---|---|
| IP1 | 568 | Good |
| IP2 | 461 | Good |
| Comparison IPC3 | 1157 | Poor |

In Table 7, force of <1000 [g/6.25 cm] means a good block resistance for a satin paint, whereas a force of >1000 [g/6.25 cm] means a poor good block resistance for a satin paint.

Example 8

Wood Protection Paints

Wood protection paints were prepared according to the following recipe given in Table 8 using the emulsion E2 for paint WP1, E4 for paint WP2. As comparison a paint WPC3 was made with comparison emulsion C1 and WPC4 with comparison emulsion C4.

TABLE 8

| Ingredients | p.b.w. |
|---|---|
| Water | 77.0 |
| AMP 90 | 3.0 |
| Dispersing agent, Additol VXW 6208 | 5.0 |
| Defoamer BYK 044 | 2.0 |
| PU Thickener, Tafigel PUR 40 | 3.0 |
| Titanium dioxide Kronos 2310 | 190.0 |
| Calcium carbonate Omyacarb 5 GU | 135.0 |
| Mica Celia 100 L | 25.0 |
| Water | 30.0 |
| Emulsion adjusted to 50% solid with water | 510.0 |
| Dowanol DPnB | 10.0 |
| Film protection agent Acticide MKB 3 | 10.0 |
| Total | 1000.0 |

The block resistance of the paints was measured as follows:

Microscope slides (76×26×1 mm) from Marienfeld were coated at a wet-film thickness of 200 µm. After drying for 24 hours at room temperature and further 72 hours at 50° C., two coated microscope slides were placed with their coated sides together and were subjected at 23° C. and 50% humidity for 1 hour to a force of 1 kg. Subsequently the force required to separate the microscope slides was determined in [g/6.25 cm].

Evaluation:
>1000 [g/6.25 cm²] means a poor block resistance for a wood protection paint
<1000 [g/6.25 cm²] means a good block resistance for a wood protection paint.

The elongation at break of the paints was measured as follows:

The paints were used to produce wet film coatings having a thickness of 400 µm on a polyester foil. After drying at 23° C./50% humidity for 7 days the paint films were removed from the polyester foil and the elongation at break is measured.

Evaluation:
Elongation at break >150% means high elasticity
Elongation at break of <150%. means poor elasticity.

The results of the block resistance and elongation at break tests are summarized in Table 9

TABLE 9

| Wood protection Paint | Force to separate the blocked paint films in [g/6.25 cm²] | Block resistance | Elonagation at break | Elasticity of the paint film |
|---|---|---|---|---|
| WP1 | 681 | Good | 203 | High |
| WP2 | 990 | Good | 276 | High |
| Comparison WPC1 | 275 | Good | 133 | Poor |
| Comparison WPC2 | 2420 | Poor | 466 | High |

What is claimed is:

1. An emulsion polymerization process for making binder emulsions, comprising:
   (a) polymerizing, in a first stage and under ethylene pressure, a first monomer composition comprising from about 60 weight percent to about 95 weight percent of at least one vinyl ester, from about 5 weight percent to about 40 weight percent ethylene, and at least one of an epoxy-functional, ethylenically unsaturated compound or a silicone-functional, ethylenically unsaturated compound, to produce a first stage product having a $T_g$ of less than 25° C.; and
   (b) polymerizing, in a second stage and in the presence of said first stage product, a second monomer composition comprising at least 95 weight percent of ethyl methacrylate, butyl methacrylate or mixtures thereof, or a mixture of methyl methacrylate with an acrylic ester selected from the group consisting of butyl acrylate and ethylhexyl acrylate, such that the polymer produced by said second monomer composition has a $T_g$ from 5 to 90° C.

2. An emulsion polymerization process according to claim 1, wherein the copolymer produced by said first monomer composition has a lower $T_g$ than the polymer produced by said second monomer composition.

3. An emulsion polymerization process according to claim 1, wherein the vinyl ester is vinyl acetate.

4. An emulsion polymerization process according to claim 1, wherein the first monomer composition further comprises from 0.05 weight percent to about 5 weight percent of at least one of an ethylenically unsaturated mono- and/or dicarboxylic acid, an ethylenically unsaturated sulfonic acid, an ethylenically unsaturated phosphoric acid, an ethylenically unsaturated phosphonic acid, and an amide of an ethylenically unsaturated mono- and/or dicarboxylic acid.

5. An emulsion polymerization process according to claim 1, wherein the second monomer composition further comprises from about 0.05 weight percent to about 5 weight percent of at least one of an ethylenically unsaturated mono- and/or dicarboxylic acid, an ethylenically unsaturated sulfonic acid, an ethylenically unsaturated phosphoric acid, an ethylenically unsaturated phosphonic acid, and an amide of an ethylenically unsaturated mono- and/or dicarboxylic acid.

6. An emulsion polymerization process according to claim 1, wherein the copolymer produced by said first monomer composition has a glass transition temperature in the range of about 5° C. to about 15° C.

7. An emulsion polymerization process according to claim 1, wherein the polymer produced by said second monomer composition has a glass transition temperature in the range of from about 10° C. to about 75° C.

8. An emulsion polymerization process according to claim 1, wherein the weight ratio of the first monomer composition to the second monomer composition is in the range 60:40 to 95:5.

9. An emulsion polymerization process according to claim 1, wherein at least one of the first and second monomer compositions additionally comprise an anionic emulsifier and/or a nonionic emulsifier.

10. A polymer emulsion produced by the process of claim 1.

11. A paint composition comprising the polymer emulsion of claim 10 and at least one pigment.

12. The paint composition of claim 11 and having a minimum film forming temperature of less than 5° C.

13. The paint composition of claim 11, wherein the paint is a wood protection paint, a gloss paint or an interior paint.

14. A coating produced from paint composition of claim 11 and having a water take up value (w) of less than 0.15 kg/(m²h^{0.5}).

15. A plaster composition comprising the polymer emulsion of claim 10 and at least one filler.

16. A thermal insulation system comprising the plaster composition of claim 15.

17. An emulsion polymerization process according to claim 1, wherein the polymer produced by said second monomer composition has a glass transition temperature in the range of from about 15° C. to about 50° C.

18. An emulsion polymerization process according to claim 1, wherein the polymer produced by said second monomer composition has a glass transition temperature in the range of from 17 to 78° C.

19. An emulsion polymerization process according to claim 1, wherein the amount of the epoxy-functional, ethylenically unsaturated compounds or silicone-functional, ethylenically unsaturated compounds is from 0.7 weight percent to 5 weight percent.

* * * * *